(12) United States Patent
Schmidt et al.

(10) Patent No.: US 7,861,223 B1
(45) Date of Patent: Dec. 28, 2010

(54) SYSTEMS AND METHODS THAT EMPLOY AN EXTENSIBLE ARCHITECTURE TO DEFINE CONFIGURATION FUNCTIONALITY

(75) Inventors: Gregory Schmidt, Aurora, OH (US); Rahul P. Patel, Mayfield Heights, OH (US); Kevin W. Peters, Aurora, OH (US); Tomasz R. Ryback, Mentor, OH (US); Gregory G. Steinbeck, Macedonia, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 878 days.

(21) Appl. No.: 10/951,193

(22) Filed: Sep. 27, 2004

(51) Int. Cl.
*G06F 9/44* (2006.01)

(52) U.S. Cl. .................. 717/120; 717/121; 717/106; 717/107; 717/114

(58) Field of Classification Search .............. None
See application file for complete search history.

(56) References Cited

U.S. PATENT DOCUMENTS 5,963,446 A   10/1999   Klein et al.

| 2003/0018666 | A1  | 1/2003  | Chen et al. |
| 2003/0055884 | A1* | 3/2003  | Yuen et al. ............ 709/203 |
| 2003/0163603 | A1  | 8/2003  | Fry et al. |
| 2003/0229900 | A1* | 12/2003 | Reisman ............ 725/87 |
| 2004/0015827 | A1  | 1/2004  | Nicolle et al. |
| 2004/0015891 | A1  | 1/2004  | Arellano-Payne et al. |
| 2004/0177094 | A1  | 9/2004  | Jacobs et al. |
| 2005/0027888 | A1* | 2/2005  | Juszkiewicz ........... 709/250 |
| 2006/0168158 | A1* | 7/2006  | Das ...................... 709/220 |
| 2007/0112643 | A1* | 5/2007  | Veres et al. ............ 705/26 |

* cited by examiner

*Primary Examiner*—Insun Kang
(74) *Attorney, Agent, or Firm*—Turocy & Watson LLP; R. Scott Speroff; John M. Miller

(57) ABSTRACT

The subject invention relates to systems and methods that generate modules profiles for industrial control modules (e.g., I/O, scanners, adapters . . . ). A module profile generally includes a set of components, interfaces and/or plug-ins that determine possible configurations for a module. Such entities are packaged in an XML based format to provide a dynamic module profile, wherein a definition type can be dynamically changed. Development and/or configuration of a module can be achieved through an industrial software development environment via a graphical hierarchical representation of configuration options defined in the module profile. In addition, the module profile provides for separately installable/release independent utilization via XML and COM based interfaces, wherein an end-user does not have to wait for a new software release in order to add a new module.

26 Claims, 9 Drawing Sheets

```
<AOPModuleTypes>
    <ModuleType />
    <Module />
    <ModuleDefinition />
    <Construction>
            <ConfigTag/>
            <Connections />
    </Construction>
    <Connection />
    <DataType />
    <Enum />
    <Range />
    <Value />
    <Strings />
</AOPModuleTypes>
```

SYSTEMS AND METHODS THAT EMPLOY AN EXTENSIBLE ARCHITECTURE TO DEFINE CONFIGURATION FUNCTIONALITY

TECHNICAL FIELD

The subject invention relates to industrial control systems and, more particularly, to systems and methods that utilize a dynamic module profile to modify and extend configuration functionality of an industrial control module.

BACKGROUND OF THE INVENTION

Industrial controllers are special purpose processing devices used for controlling (e.g., automated and semi-automated) industrial processes, machines, manufacturing equipment, plants, and the like. A typical controller executes a control program or routine in order to measure one or more process variables or inputs representative of the status of a controlled process and/or effectuate outputs associated with control of the process. Such inputs and outputs can be binary, (e.g., "1" or "0," "on" or "off," . . . ), and/or analog, assuming a continuous range of values. A typical control routine can be created in a controller configuration environment that has various tools and interfaces whereby a developer can construct and implement a control strategy using industrial and conventional programming languages or graphical representations of control functionality. Such control routine can be downloaded from the configuration system into one or more controllers for implementation of the control strategy in controlling a process or machine.

Measured inputs received from a controlled process and outputs transmitted to the process can pass through one or more input/output (I/O) modules in a control system. Such modules can serve in the capacity of an electrical interface between the controller and the controlled process and can be located local or remote from the controller. Inputs and outputs can be recorded in memory. The input values can be asynchronously or synchronously read from the controlled process by one or more input modules and output values can be written directly to memory by a processor for subsequent communication to the process by specialized communications circuitry. An output module can interface directly with a controlled process by providing an output from memory to an actuator such as a motor, drive, valve, solenoid, and the like.

During execution of the control routine, values of the inputs and outputs exchanged with the controlled process can pass through memory. The values of inputs in memory can be asynchronously or synchronously updated from the controlled process by dedicated and/or common scanning circuitry. Such scanning circuitry can communicate with input and/or output modules over a bus on a backplane or network. The scanning circuitry can also asynchronously or synchronously write values of the outputs in memory to the controlled process. The output values from the memory can be communicated to one or more output modules for interfacing with the process. Thus, a controller processor can simply access the memory rather than needing to communicate directly with the controlled process.

In distributed control systems, controller hardware configuration can be facilitated by separating the industrial controller into a number of control elements, each of which performs a different function. Particular control modules needed for the control task can then be connected together on a common backplane within a rack and/or through a network or other communications medium. The control modules can include processors, power supplies, network communication modules, and I/O modules exchanging input and output signals directly with the controlled process. Data can be exchanged between modules using a backplane communications bus, which can be serial or parallel, or via a network. In addition to performing I/O operations based solely on network communications, smart modules exist which can execute autonomous logical or other control programs or routines. Various control modules of a distributed industrial control system can be spatially distributed along a common communication link in several locations. Certain I/O modules can thus be located proximate to a portion of the control equipment, and away from the remainder of the controller. Data can be communicated with these remote modules over a common communication link, or network, wherein all modules on the network communicate via a standard communications protocol.

In a typical distributed control system, one or more I/O modules are provided for interfacing with a process. The outputs derive their control or output values in the form of a message from a master or peer device over a network or a backplane. For example, an output module can receive an output value from a processor via a communications network or a backplane communications bus. The desired output value is generally sent to the output module in a message. The output module receiving such a message will provide a corresponding output (analog or digital) to the controlled process. Input modules measure a value of a process variable and report the input values to another device over a network or backplane. The input values can be used by a processor for performing control computations.

Conventionally, many industrial control modules are programmed with "hard-coded" (e.g., C, C++ . . . ) instructions that define module parameters and configuration options. As a consequence, additions and/or changes to configuration functionality are limited by pre-defined structures established via the code and, in order to change or introduce functionality, the core code is modified and recompiled. Such inflexibility can restrict development productivity and limit the ability to engage third-party developers. Therefore, there is a need to increase module code flexibility to improve development efforts.

SUMMARY OF THE INVENTION

The following presents a simplified summary of the invention in order to provide a basic understanding of some aspects of the invention. This summary is not an extensive overview of the invention. It is intended neither to identify key or critical elements of the invention nor to delineate the scope of the invention. Its sole purpose is to present some concepts of the invention in a simplified form as a prelude to the more detailed description that is presented later.

The subject invention provides systems and methods that generate module profiles for industrial control modules. Such profiles typically include a plurality of definition types, components, interfaces and/or extensions (e.g., plug-ins) for a module (or module family) within an XML based package. The output of this module profile, which includes the definition type and configuration data, can be loaded on a module. An end-user can dynamically change a module's definition type without having to delete and/or re-create the software module instance. Changing a module's definition type can result in any number of changes to the software representation of the physical module including adding, deleting or altering connections, data types, and data values. The module profile provides for separately installable/release independent utilization via XML and COM based interfaces, wherein an end-user does not have to wait for a new software release to add a new module type. Such flexibility can improve development productivity and the ability to engage third-party developers. Thus, the subject invention provides for novel improvements over conventional system that typically utilize "hard-coded" (e.g., C, C++ . . . ) instructions to define module parameters and configuration options, require recompiling altered code in order to change a module's configuration functionality since these systems are limited by pre-defined structures established via the code and require new software releases to add new modules.

In one aspect of the subject invention, a system that generates profiles for an industrial control module is provided. The system comprises a profile generator that obtains information associated with a particular industrial control module from an input specification and employs this information to construct a module profile (e.g., a model of the physical module). The output of the module profile (e.g., a definition type and configuration data) can be loaded on the module and utilized to specify and/or configure parameters. The profile generator can include an assembler that facilitates determining what objects are available, and how to package various components, interfaces, extensions (e.g., plug-ins), etc. for a particular module. In addition, the profile manager includes a behavior manager that can be utilized to define multiple behaviors for entities that support more than one behavior and a packaging component that facilitate generating an XML package of selected components, interfaces, extensions, etc. After packaging the components, interfaces, extensions, etc. into a module profile, definition types and configurations parameters associated with the module profile can be utilized by an end-user to configure the module, such as a type redefinition. Such configuration can be achieved through a tree structure of hierarchical options, wherein the end-user can select options, set attributes, modify values, disable functionality, etc.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention can be employed. Other aspects, advantages and novel features of the invention will become apparent from the following detailed description of the invention when considered in conjunction with the drawings.

BRIEF DESCRIPTION OF THE DRAWINGS

FIG. 5 illustrates an exemplary XML pseudo code representation of a module profile.

DETAILED DESCRIPTION OF THE INVENTION

Figure 1:
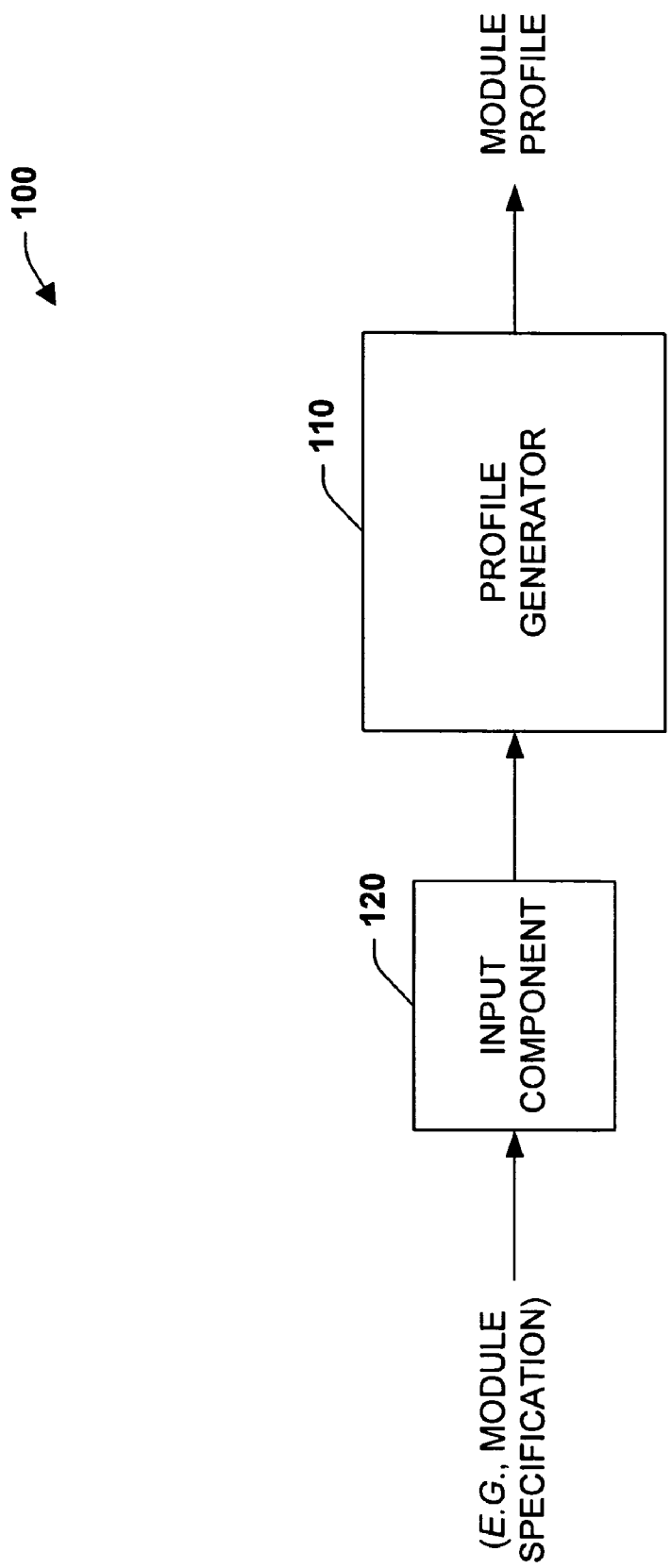
FIG. 1 illustrates a system that generates dynamic profiles that enables a user to specify and configure parameters for an industrial control module.

As utilized in this application, terms "component," "system," "controller," "module," "device," "manager," and variants thereof are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers.

The subject invention relates to systems and methods that generate module profiles that define a set of configurations for a module and/or a family of modules. In addition, the module profile can include a set of module type definitions that are available to the end-user without requiring the profile developer to write and/or recompile core code. The end-user can utilize the output of a module profile to variously configure a module within the scope defined by the module profile. The dynamic nature of the output enables the end-user to dynamically change a module's definition type without having to re-create the module instance.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

FIG. 1 illustrates a system 100 that generates profiles for specifying and configuring an industrial control module. The system 100 comprises a profile generator 110 that obtains information associated with a particular industrial control module via input 120 and employs this information to construct a module profile (e.g., a software model of the physical module), which defines a set of potential module definition types and module and controller configuration data. The output of the module profile can be loaded on the module and utilized to specify and/or configure module parameters, for example, to dynamically redefine the type definition from the set of potential definition types. In general, the module profile can include a collection of components (e.g., DLLs, XML files, COM objects . . . ) that characterize a behavior of a physical module (e.g., type variations, connections, configuration . . . ).

The generated module profile (e.g., markup language based) can define the scope of and facilitate configuring module (e.g., I/O, scanners, adapters, bridges . . . ) parameters, definition types, and options. In addition, the module profile output can be dynamic such that an end-user configuring the module can seamlessly add and/or change functionality without any need to re-instantiate the object model. For example, an end-user can re-configure the I/O module by changing its definition type and thus affecting the object model by adding or deleting a connection (e.g., a periodic data transfer to/from the I/O module), while preserving remaining configuration. In another example, the end-user can change a data type (e.g., from integer to floating point) associated with the I/O module via the object model without being required to re-create the object model. Additions and/or changes can be achieved by dynamically changing a module definition type and include, but are not limited to, changes in data types, changes to configuration data values, and changes to the connection structure. Additions, deletions, and transformations of objects and data can take place. Such change results in a definition type metamorphosis since the definition type is transformed from one type to another type on-the-fly and without deletion and re-creation of the object model within the control system. This novel feature provides for improvements over conventional techniques where, in order for an end-user to add and/or change functionality, an existing module instance is deleted and subsequently re-created to be of the desired definition type. Furthermore, this feature provides the ability of a profile developer to specify the set of type definitions and module behaviors in XML without requiring code to be rewritten.

The profile generator 110 creates an internal object model of the module, which can be dynamically re-configured, as needed, to change definition types to any type supported by the profile and, thus, mitigate any need for object deletion and re-creation. For example, if the module definition type change does not affect portions of the object model, the unchanged object(s) do not change and existing data is preserved, but if the definition type change does affect the object model, then the object model can be morphed on-the-fly based on the module profile and new objects are populated with default values. The subject invention also provides a provision (e.g., via plug-in software components) to allow translation of data from the original object type to a new replacement object of a different type. This provides the ability to specify and/or configure parameters, wherein the internal object can be morphed to any definition type defined in the module profile.

Since different module types offer unique capabilities, the profile generator 110 can be utilized to generate a specific module profile for a particular module type, wherein this profile can encompass virtually all components (e.g., DLLs, COM objects, XML files . . . ), interfaces, extensions, etc. deemed relevant to the module by a developer of the module profile. Thus, the definition type and/or configuration data loaded on the module can be based on the process, plant, machine, manufacture, etc. that an associated controller and/or the module is monitoring and/or controlling. A developer can add desired functionality by creating plug-ins that re-use and/or replace existing interfaces. Thus, if the base validation functionality does not support sufficient error checking, such functionality can be added through a validation plug-in. It is to be appreciated that this example is illustrative and not limitative. In general, both the core code and a plug-in can translate data such that one set of selections can be translated to another set of selections.

As described in detail below, the input component 120 can be a user interface (UI), an application programming interface (API), a software development environment, an industrial control development tool, etc. Thus, the user can interact with the input component 120 to generate the module profile. For example, the profile developer can determine what components, interfaces, plug-ins, etc. to include with the profile. In one aspect of the invention, this is achieved through various utilities and tools associated with the input component 120. In another aspect of the invention, the user utilizes the input component 120 to provide a module specification to the profile generator 110, wherein the profile generator 110 automatically creates the module profile based on the module specification.

In addition, the subject invention provides for separately installable/release independent utilization via XML and COM based interfaces. Thus, an end-user does not have to wait for a new software release of the base control system software in order to add a new module. For example, the end-user can purchase and install I/O support independent of the base control system software version. This provides for a novel improvement over conventional systems that require a new software release to add new modules. It also facilitates the ability of third parties to integrate new I/O devices into the system.

Figure 2:
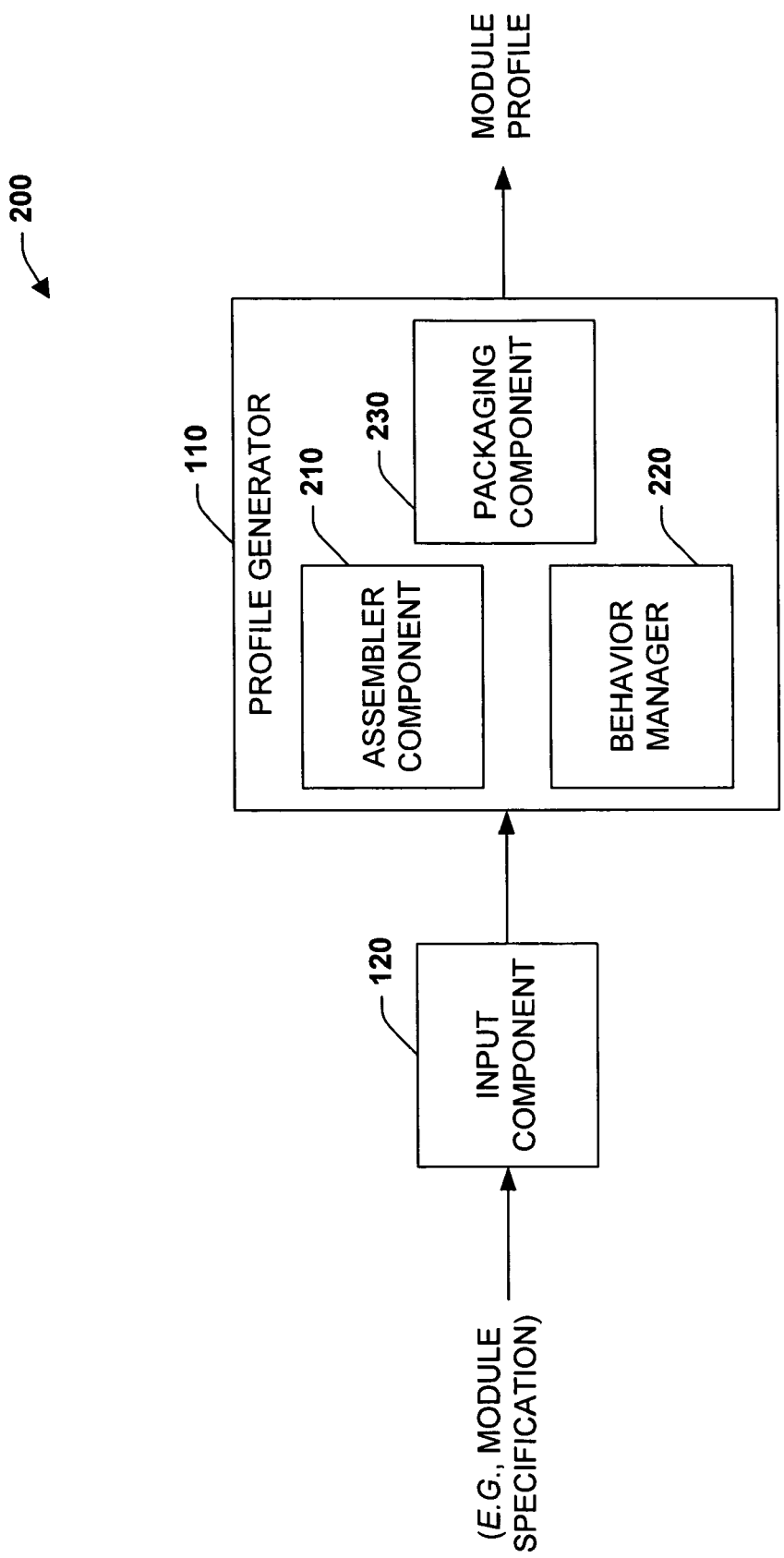
FIG. 2 illustrates a system that employs a profile generator to select, define behavior and package components, interfaces, extensions and/or plug-ins in a dynamic module profile.

FIG. 2 illustrates a system 200 that comprises the input component 120 and the profile generator 110, wherein the profile generator 110 includes an assembler component 210, a behavior manager component 220, and a packaging component 230. As noted above, the profile manager 110 receives module information via the input component 120 and this information is utilized to construct a module profile for the module that specifies module configuration (e.g., filtering, ranges, scaling, latching behavior . . . ).

The assembler 210 facilitates determining which components, interfaces, extensions/plug-ins, etc. to include with a module profile, what objects can exist, and how to assemble such components, interfaces, extensions/plug-ins, etc. in the module profile. In general, a collection of standard components and interfaces and various user defined plug-ins can be available for incorporation into a module profile, and the assembler 210 can facilitate selecting the components, interfaces, extensions, which can be the complete set or a subset thereof, for the particular module profile along with its associated definition type.

It is to be appreciated that respective constituents (e.g., components, interfaces, plug-ins . . . ) of a module profile can be associated with static and/or variable (e.g., as defined by the profile developer) behavior. The behavior manager 220 can be utilized to determine and define suitable behavior. Examples of behaviors include validating data before applying the data, warning a user prior to performing critical operations, coordinating data with external changes, etc. The packaging component 230 can facilitate assembling the set of components, interfaces, plug-ins, etc. into a module profile (e.g., XML). The components, interfaces and/or plug-ins included in a module profile essentially define the configuration scope (e.g., the possible definition types) for a module. Thus, an end-user can configure an instance of the module within the bounds defined by the associated module profile.

As noted above, the module profile can be assembled into a package and the end-user can change module functionality (e.g., its definition type . . . ) based on the package without having to replace the software module instance. It is to be appreciated that such package can be based on a markup language such as XML, for example. XML provides a structure and organization for the module profile and can specify changes in the underlying object model for the module. In addition, XML can be utilized to define module types, tags, ranges, data types, definition types, minimum values, maximum values, enumerations, etc. Conventional systems typically utilize hard coded (e.g., C++) instructions and, thus, new code must be generated and compiled in order to add and/or change module configuration functionality. The nature of the module profile of the subject invention mitigates any need for new code to add and/or change module configuration functionality and, therefore, provides for a novel improvement over conventional systems that can reduce cost associated with development, derivation and updates for a module profile.

Figure 3:
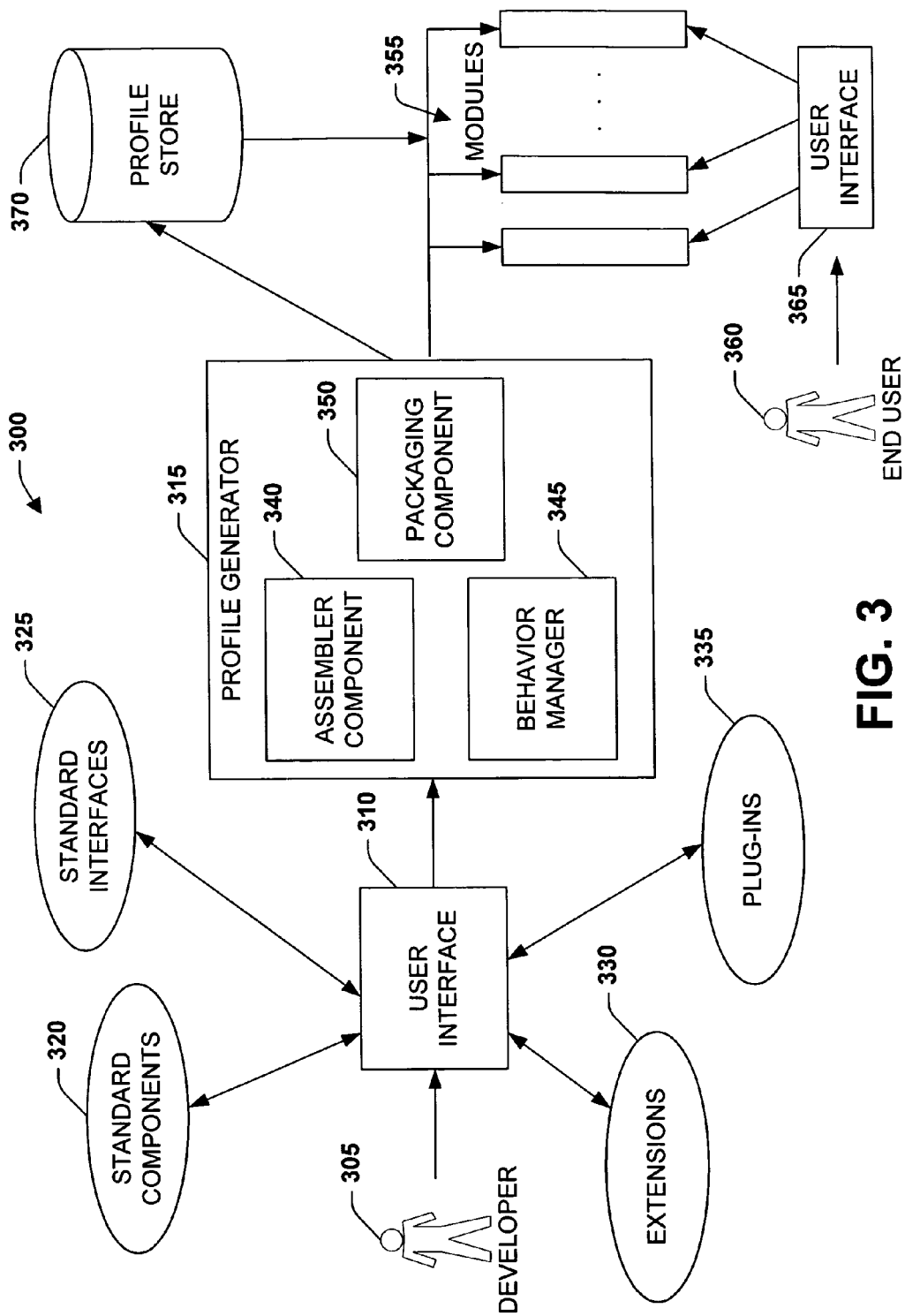
FIG. 3 illustrates a system that facilitates generation and utilization of dynamic module profiles.

FIG. 3 illustrates a system 300 wherein a developer 305 employs a developer user interface (UI) 310 to interact with a profile generator 315 in order to generate module profiles for industrial control modules (e.g., UO, bridge . . . ). The developer 305 utilizes the UI 310 to create and/or select entities from a standard components bank 320 (e.g., for storing DLLs, COM objects, XML files . . . ), an interface bank 325, an extensions bank 330, and a plug-in bank 335. These banks consist of both standardized components in addition to highly specific components provided by profile developers. Selected components, interfaces, extensions, and/or plug-ins can include all available components, interfaces, and/or extensions, or a subset thereof. It is to be appreciated that selected components, interfaces, extensions, and/or plug-ins from the standard components bank 320, the standard interface bank 325, the extensions bank 330, and the plug-in bank 335 can be re-useable and/or grouped for a family of modules.

The profile generator 325 comprises an assembler component 340, a behavior manager component 345, and a packaging component 350. The assembler 340 can facilitate grouping the set of components, interfaces, extensions, plug-ins, etc. for packaging within a module profile. The behavior manager 345 can define behavior for the selected components, interfaces, extensions, plug-ins, etc. For example, in many instances one or more components, interfaces, extensions, plug-ins, etc. can behave differently depending on the contents of the XML description. The behavior manager 345 can set suitable behavior based on input provided by the developer 305. The packaging component 350 can package the selected components, interfaces, extensions, plug-ins, etc. into a module profile.

The module profile can be generated in essentially any language, including standard and proprietary languages. In one instance, a markup language can be utilized. Suitable markup languages include Extensible Markup Language (XML), Standard Generalized Markup Language (SGML), and Hyper Text Markup Language (HTML), for example. By utilizing a markup language, the profile generator 315 can generate internal object models for the one or more modules 355. Such object models can vary dynamically to reflect a change in definition type. This provides the ability to specify and/or configure I/O parameters with an internal object, wherein the internal object can be morphed to any of the definition types supported by the object model.

The profile generator 315 can be utilized to generate a module profile that defines a set of definition types and configuration data. The output of the module profile can be utilized to dynamically change the physical module's definition type and configuration data without user intervention. It is to be appreciated that an initial default configuration can be employed or the end-user can be required to set up the module prior to module operation. As noted above, the configuration of a module can be dynamically changed by the end-user to change the definition type as well as other configuration without any need to regenerate the instance of the module. As depicted, the end-user 360 is provided with an end-user user interface (UI) 365, which enables the end-user a mechanism to effectuate configuration of the modules 355. In one aspect of the subject invention, the module profile defines a set of definition type transformations, as well as other configuration, wherein the end-user can dynamically switch between definition types of the object at essentially any time through a definition type morphing approach, which mitigates re-creating the software module instance. Generated module profiles can be stored in a profile store 370 for subsequent use.

It is to be appreciated that the developer UI 310 and the end-user UI 365 can be industrial control development environments, human interface, application programming interfaces (APIs), graphical user interfaces (GUIs), command line interfaces, software development studios, and the like. As such, the UIs 310 and 365 can provide regions and/or means to alter and/or manipulate graphical objects (e.g., icons, structures, text boxes, etc.). In addition, input regions can provide for entry of parameters, arguments, etc. that can be utilized to effectuate such entities. Moreover, one or more presentation regions can be provided to dynamically present interfaces to the developer and/or end-user to provide a preview of any alteration, manipulation and/or change. The UIs 310 and 365 can include basic text and/or graphic regions that incorporate dialogue boxes, static controls, drop-down-menus, list boxes, pop-up menus, edit controls, combo boxes, radio buttons, check boxes, push buttons, and graphic boxes, for example. In addition, utilities such as vertical and/or horizontal scroll bars that facilitate navigation and toolbar buttons to determine whether a region will be viewable, hidden, minimized, etc. can be employed.

The developer and/or end-user can interact with at least the aforementioned regions to select and provide information via various devices such as a mouse, a roller ball, a keypad, a keyboard, a pen and/or voice activation, for example. Typically, a mechanism such as a push button or an enter key on the keyboard/keypad can be employed subsequent to entering textual and/or voice information in order to invoke a response. However, it is to be appreciated that the invention is not so limited. For example, merely highlighting a check box can elicit an action. In another example, a command line interface can be employed to prompt (e.g., via a text message on a display and an audio tone) the developer and/or end-user to perform an action or provide information via alpha-numeric input corresponding to an option provided in the prompt or an answer to a question posed in the prompt.

Moreover, the end-user UI 365 can be associated with a set of re-useable standard human interface (HI) components (e.g., as specified by an XML description) that facilitate setting a definition type and configuring controller and module data, for example, by providing display and editing capabilities. These components can be generated by assembling an aggregate component from a set of standardized HI controls. It is to be appreciated that the HI components and controls can be of a generalized nature or industry specific.

Figure 4:
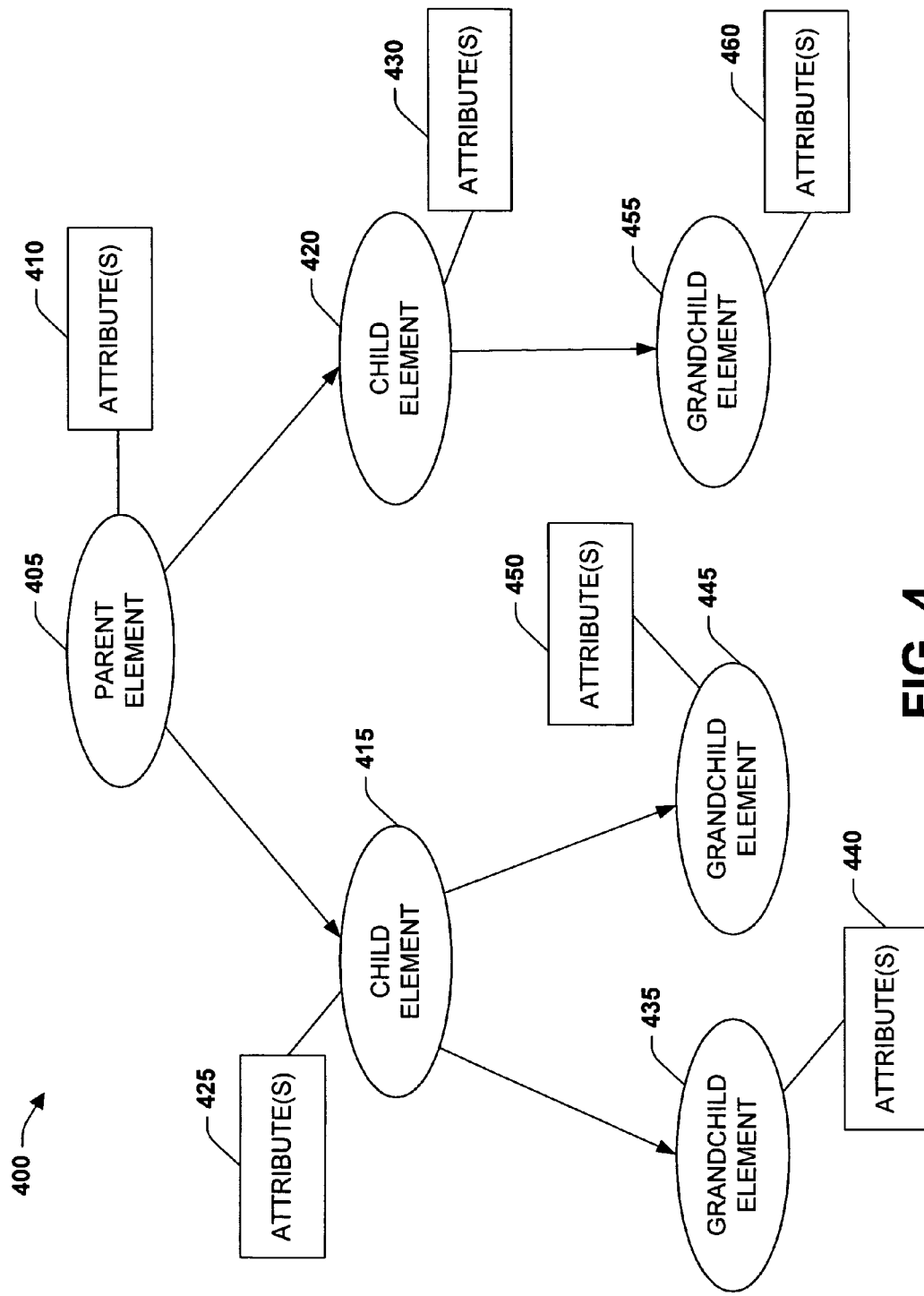
FIG. 4 illustrates an exemplary tree technique for configuring a dynamic module profile within a module.

FIG. 4 illustrates an exemplary technique for configuring a module instances. The technique delineates configuration options via a selection tree 400, which can be representative of a hierarchical arrangement of the configuration options defined within an XML module profile, for example. It is to be appreciated that this hierarchy can be constructed in a least restrictive to most restrictive format. In addition, a user selection defined at any particular level of the tree can affect other selection(s) appearing elsewhere in the tree. In addition, the selection tree 400 is provided for explanatory purposes and does not limit the invention. For example, trees with more or less branches and/or different structures can be employed in accordance with aspects of the subject invention.

The selection tree 400 comprises a parent element 405 with associated attributes 410. The attribute can include information such as a name of the element, for example. The parent element 410 is depicted with two branches, wherein one branch leads to a child element 415 and the other branch leads to child element 420. The child elements 415 and 420 are associated with respective attributes 425 and 430. The child element 415 also includes two branches. One of the branches leads to grandchild element 435 with associated attribute 440, and the other branch leads to grandchild element 445 with associated attribute 450. The child element 420 includes one branch to a grandchild element 455 with associated attribute 460.

By way of example, the parent element 405 can be considered a root of the selection tree 400. The children leaves 415 and 420 from the root 400 can provide legal configuration options for direct and rack, respectively. For example, the grandchildren leaves 435 and 445 from the direct leaf 415 can be associated with diagnostics configuration. For example, selecting leaf 435 can enable diagnostics, whereas selecting leaf 450 can enable no diagnostics (disable diagnostics). For rack configuration, diagnostics can be enabled by default. The leaf 455 can provide a means for the end-user to turn off diagnostics via selecting no diagnostics. In addition, any or all of the attributes 440, 450 and 460 associated with the configuration options 435, 445, and 455 can be utilized to store unique identifiers/identifications.

The selection tree 400 can be utilized to present configuration options to an end-user. Such presentation can be graphical, for example, within a user interface such as the UI 310 or the UI 365. In addition, the tree 400 can be displayed as depicted and/or in one or more different formats (e.g., a grid, a list, nested drop down menus, pop-up windows . . . ) representative of the tree 400. In general, the end-user can begin configuring (e.g., walk through) the module at any level of the profile hierarchy tree and can switch between such levels as desired and permitted. Typically, configuring a particular element/attribute within the tree 400 affects one or more other options within the tree 400, whereby setting a particular option (e.g., from a list of acceptable options) can result in additional (e.g., nested) options, discontinuation of previously presented options, setting other options to a default, or have no affect at all on available options. In general, options at one level of the tree define the options at the next level of the tree. In addition, the options available to the user define the bounds of the parameters and configuration of the module.

The end-user can reset configuration of any or all elements within the tree to a default configuration and/or any previous state of configuration. Thus, the end-user is never completely locked out or blocked from changing a configuration option. For example, if the end-user desires to set a field to a particular value, but the desired value is not available as an option due to a previous setting, the end-user can back out or change the previous setting such that the desired value can be set.

FIG. 5 illustrates exemplary XML pseudo code 500 in accordance with aspects of the subject invention. Such pseudo code 500 can represent a hierarchy and map to and/or from the tree 400 of FIG. 4. As noted above, XML can be utilized to provide a structure and organization for the module profile and can change the underlying object model for the module. In addition, XML can be utilized to define, among other things, module types, definition types, tags, ranges, data types, minimum values, maximum values, enumerations, etc. for a module. Moreover, the XML module profile can mitigate any need for new code to add and/or change module configuration functionality, when physical modules are revised, and can reduce cost associated with development, derivation and updates for a module profile.

Figure 6:
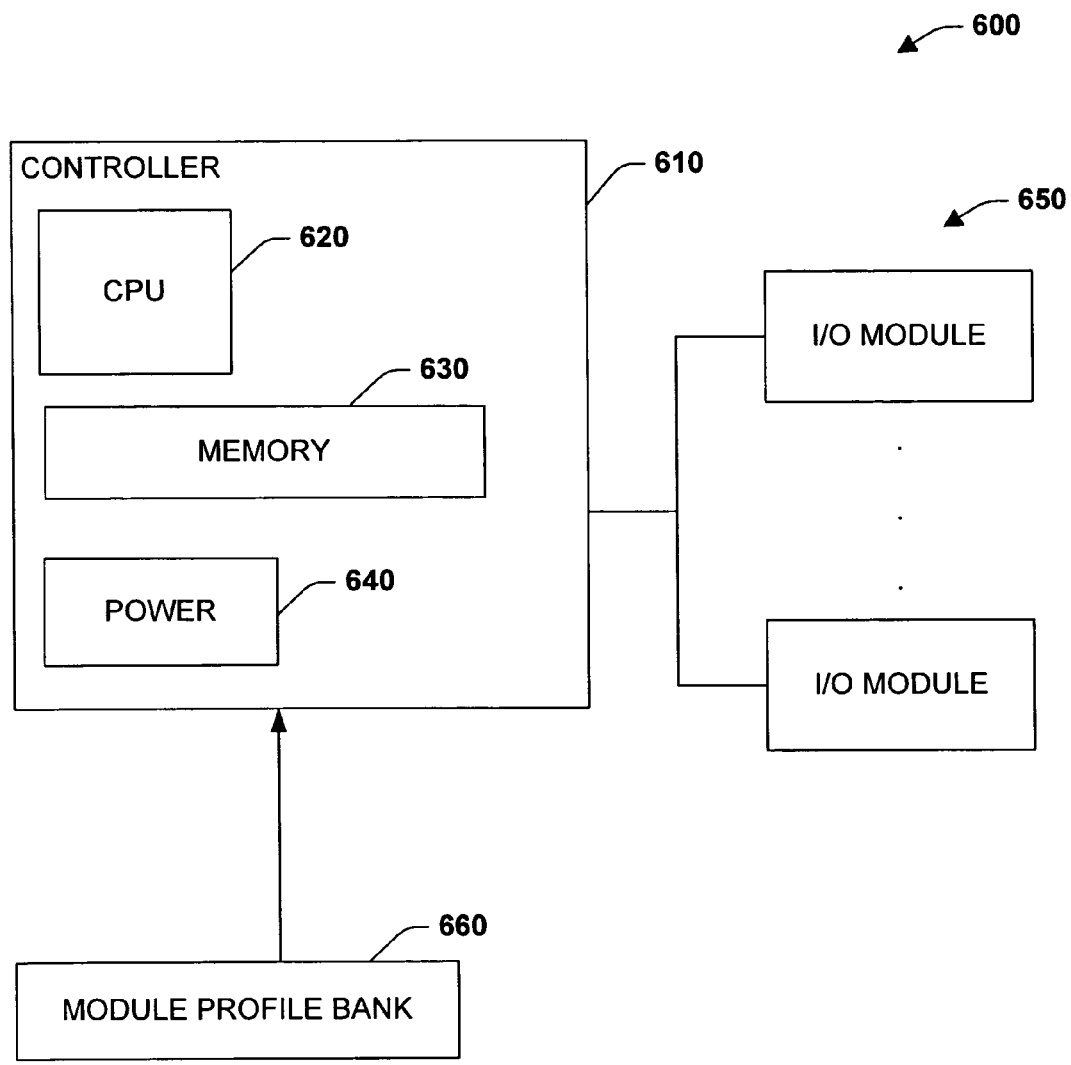
FIG. 6 illustrates an exemplary control system that employs module profiles to configure industrial control I/O modules.

FIG. 6 illustrates an exemplary control system 600 in accordance with an aspect of the subject invention. The system 600 that includes a controller 610 that includes one or more modules such as a processing module 620, a memory module 630, and a power component 640 to energize the modules therein. The processing module 620 can be utilized to execute end-user programs stored within the memory module 630. The controller 610 can be grouped with one or more I/O modules 650 or other modules such as adapters, scanners and bridges, for example, via a rack. The one or more I/O modules 650 can provide communication with the environment and/or process, machine, manufacturer, plant, etc. For example, an input channel can be employed to receive analog and digital signals through sensors, switches and the like to provide information indicative of state and/or relating to a process, and an output channel can be utilized to convey a next state to an entity under the control of the controller. In addition, the controller 610 and I/O modules 650 can be coupled to one or more additional racks (with similar controllers and/or I/O modules) through bridges (not shown).

The system 600 further includes a module profile bank 660 that is utilized to store module profiles as described herein. The module profile bank 660 can be located in configuration software installed on a workstation, desktop computer, laptop, hand held, and the like. In one aspect of the subject invention, the module profile bank 660 can be part of a project database, wherein a project, in general, defines controller and I/O data for one controller (e.g., the controller 610) and its associated I/O modules (e.g., the modules 650) within a rack. Where the control system includes multiple controllers (with respective I/O modules), multiple projects can be generated, for example, one project for each controller and its associated I/O modules, and stored in the project database. Controller and I/O data for the controller 610 can be loaded to the controller 610, wherein the controller 610 can subsequently load the I/O data to the respective I/O modules 650.

It is to be appreciated that a project can be created before or after any physical hardware (e.g., the controller 610 and the I/O modules 650) is set up. In addition, an object model can be configured prior to installing a corresponding I/O module from the I/O modules 650. After such hardware is set up and operating, I/O data can be loaded to the I/O modules 650 through the controller 610, as described above, or directly from the object model. Furthermore, information associated with the I/O modules 650 can be obtained directly from the I/O modules 650. Such information can include a CIP key, a catalog number, a description, revisions supported, port type, etc. Moreover, an extensible messaging facility to communicate with the I/O modules is provided. The messaging facility is driven by an XML description of a set of communication transactions applicable to one or more module types.

Figure 7:
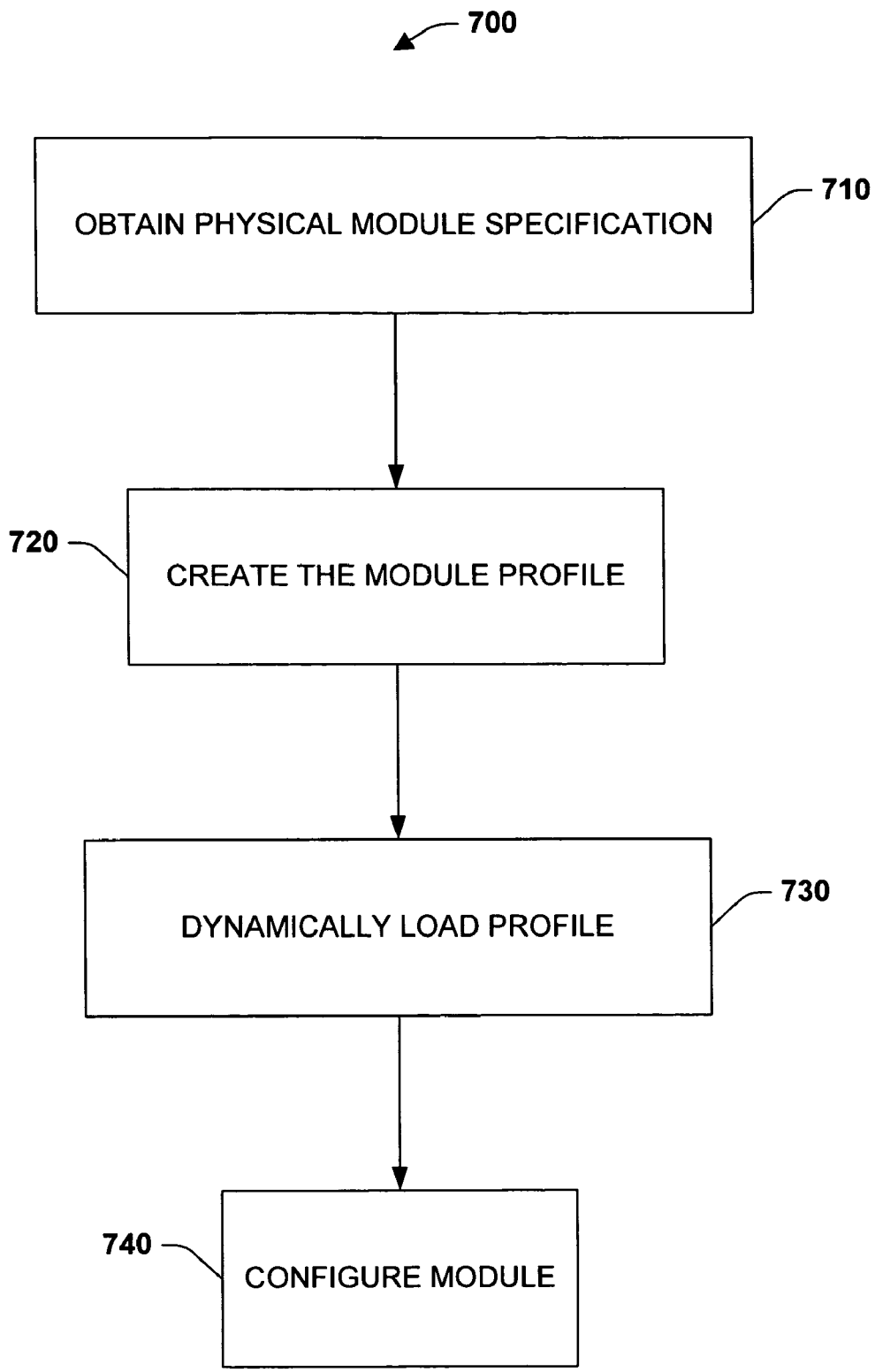
FIG. 7 illustrates a methodology that generates and employs a dynamic module profile.
Figure 8:
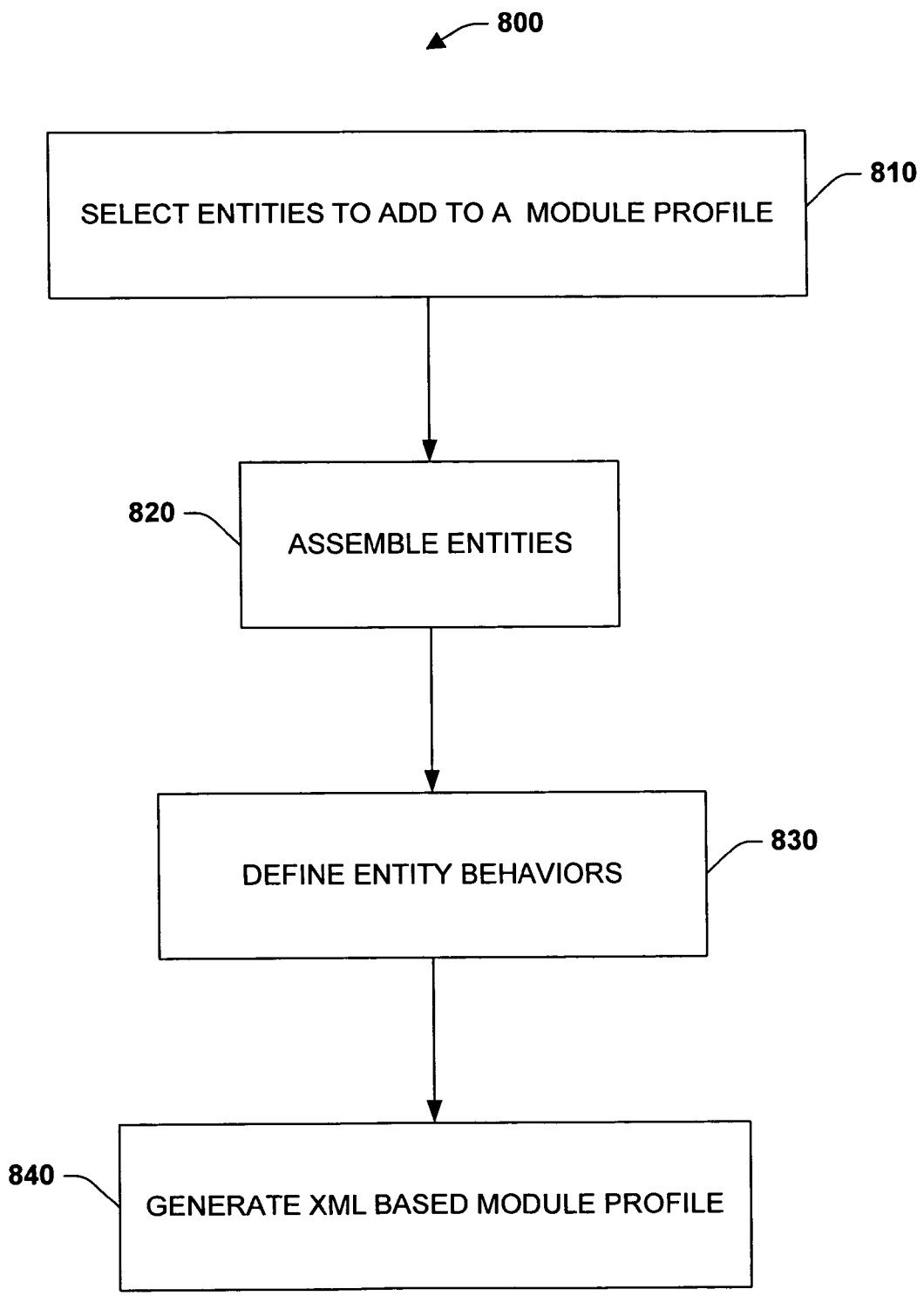
FIG. 8 illustrates a methodology that generates XML based dynamic module profile for industrial control modules.
Figure 9:
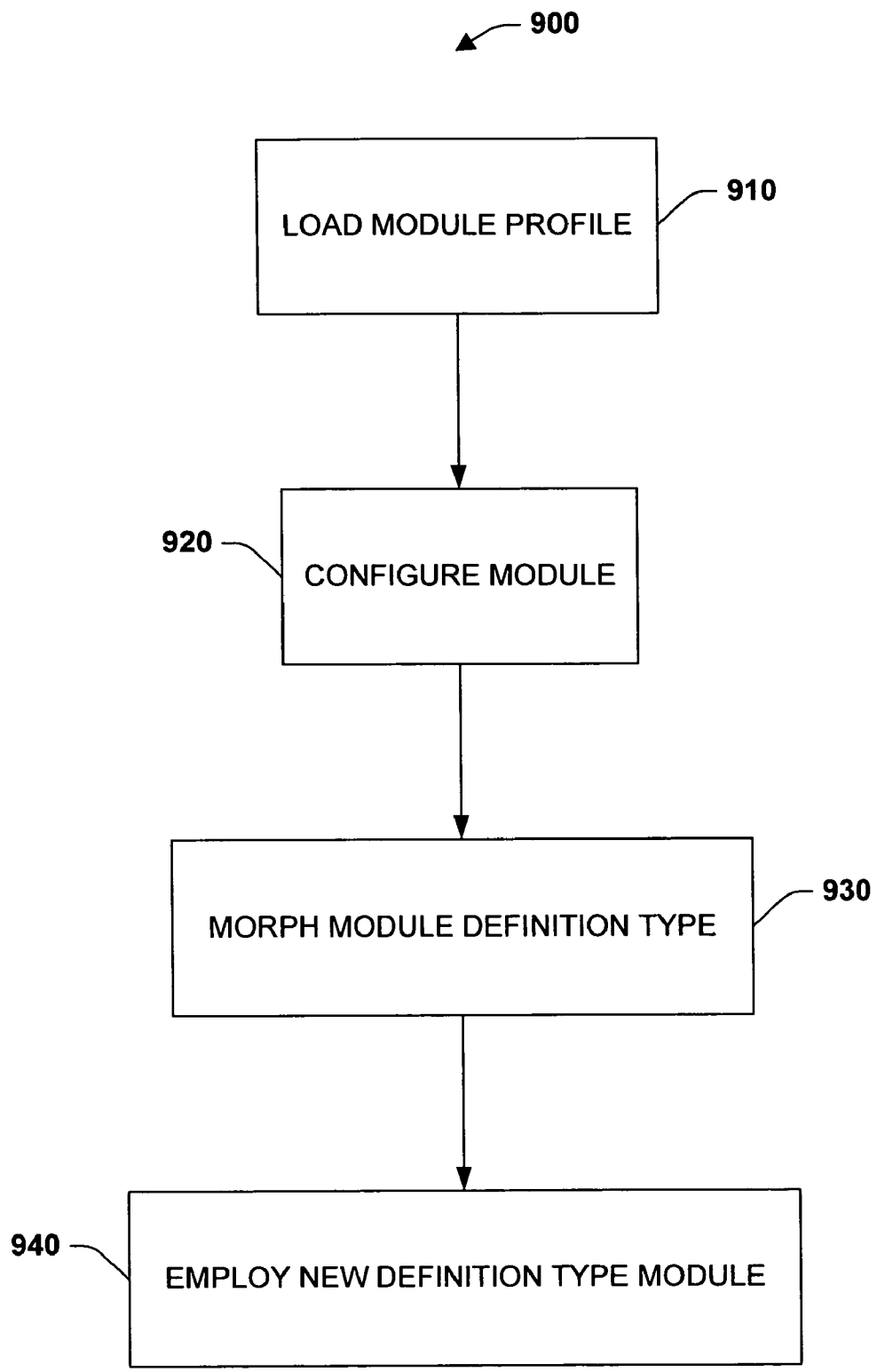
FIG. 9 illustrates a methodology to configure a module based on a dynamic module profile.

FIGS. 7-9 illustrate methodologies, in accordance with an aspect of the present invention. While, for purposes of simplicity of explanation, the methodologies are shown and described as a series of acts, it is to be understood and appreciated that the present invention is not limited by the order of acts, as some acts can, in accordance with the present invention, occur in different orders and/or concurrently with other acts from that shown and described herein. For example, those skilled in the art will understand and appreciate that one or more of the methodologies could alternatively be represented as a series of interrelated states or events, such as in a state diagram. Moreover, not all illustrated acts may be required to implement the methodologies in accordance with the present invention.

FIG. 7 illustrates a methodology 700 that generates and employs a module profile in accordance with an aspect of the subject invention. At reference 710, a specification is obtained for a module profile. For example, a hardware/firmware developer can provide a specification of the physical I/O module which can be translated into a module profiled specification that defines a plurality of definition types and other configuration options for a module. At 720, the module profile can be generated. It is to be appreciated that this module profile can be a model of the physical module, wherein the output of the module profile can be loaded on the module and utilized to specify and/or configure parameters. It is to be appreciated that the module profile can define module (e.g., I/O, scanners, adapters ... ) parameters, definition types, and configuration options. Moreover, these definitions are based on XML such that the profile developer can add/or change functionality without the need to write and/or recompile core profile code. The feature provides for novel improvements over conventional systems that typically employ hard coded instructions that are discarded when the physical module is revised and corresponding changes must be made in the configuration software. At 730, the output of the module profile is dynamically loaded into an existing control system. At 740, the module is configured based on the module profile. Such configuration can be facilitated via a graphical hierarchical representation (e.g., a tree) that presents the end-user with configuration options. Upon setting the options, the module can be employed in connection with an industrial control system.

FIG. 8 illustrates a methodology 800 that generates XML based module profile for industrial control modules. As noted above, XML can be utilized to provide a structure and organization for the module profile and can change the underlying object model for the module. In addition, XML can be utilized to define, among other things, module types, definition types, tags, ranges, data types, minimum values, maximum values, enumerations, etc. for a module. Moreover, the dynamic nature of the XML module profile can mitigate any need for new code to add and/or change module configuration functionality and reduce cost associated with development, derivation and updates for a module profile.

At reference 810, a plurality of configuration entities are selected to include in a module profile. These entities include one or more components (e.g., DLLs, COM objects, XML files ... ), interfaces, plug-ins (e.g., extensions to the base functionality), etc. Such entities can be obtained from a collection of standard components and interfaces and user specified extensions. At 820, the entities are assembled together. Such assembly can include determining which components, interfaces, plug-ins, etc. to include with a module profile, what objects are available, and how to assemble such components, interfaces, plug-ins, etc. in the module profile. At reference numeral 830, a behavior can be defined for entities with definable behavior (via XML and/or plug-ins). In addition, entity behavior can be generated in the form of plug-in software modules that morph the module object model and associated configuration data when a definition type of the module is changed. At 840, the selected entities are packaged in an XML based module profile. It is to be appreciated that the XML and plug-ins specify an internal object model of the module, and the object model can provide the ability to specify and/or configure parameters. In addition, the object model can dynamically change according to its definition type.

FIG. 9 illustrates a methodology 900 to configure a module based on a dynamic module profile. At reference numeral 910, a module profile is generated for a module. The module profile can be generated via various interfaces, for example, an API, a software development environment, an industrial control development tool, etc. At 920, the end-user configures an instance of the module based on the profile, which essentially includes all definition types, components, interfaces, plug-ins, etc. for the instance. A configured module can be utilized within an industrial control system to facilitate monitoring and/or controlling processes, plants, controllers, machines, and the like.

At reference numeral 930, the end-user employs a user interface (as described herein) to change module configuration, for example, to change the definition type of the module to another definition type supported by the module profile. This change can be facilitated through a graphical display of the module profile. For example, the module profile can be represented through a hierarchical tree structure. This tree structure can be presented to the end-user and provide the end-user with the options defined by the module profile. As described above, changes can be made to the definition type without having to re-create the software module residing within the project database. By way of example, a current definition type can morph to another definition type when invoked by the end-user. It is to be appreciated that the end-user can change the definition type as often and as many times as desired without having to re-create the module residing with the project database. At 940, the new configuration, including new I/O configuration data, is utilized by the module to facilitate monitoring and/or controlling processes, plants, controllers, machines, and the like.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention. In addition, while a particular feature of the invention may have been disclosed with respect to only one of several implementations, such feature may be combined with one or more other features of the other implementations as may be desired and advantageous for any given or particular application.

What is claimed is:

1. A system to facilitate dynamic configuration functionality additions and changes for a control module, comprising:
 a processor;
 a memory communicatively coupled to the processor, the memory having stored therein computer-executable instructions configured to implement the dynamic configuration functionality system including:
  an input component configured to receive specification information for a control module;
  an assembler component configured to select one or more predefined components to be included in a module profile for the control module and to define how the one or more predefined components are to be assembled therein based on the specification information;

a behavior manager configured to define the behavior of at least one of the predefined components based on the specification information; and a packaging component configured to automatically generate the module profile by assembling the one or more predefined components, the module profile comprising an object model for the control module that defines at least one configuration option for the control module and that facilitates selection of a setting for the at least one configuration option, wherein the module profile is configured to render the least one configuration option on a programming interface as a hierarchy of the at least one configuration option, and is configured to dynamically add or change module configuration functionality for the control module without requiring recompilation of core code associated with the module profile.

2. The system of claim 1, wherein the module profile is an extensible markup language (XML) description that specifies a structure and organization for system the control module.

3. The system of claim 1, wherein the module profile defines at least one of a module type, a definition type, a tag, a range, a data type, a tag minimum value, a tag maximum value, and or an enumeration.

4. The system of claim 1, wherein the module profile renders the at least one configuration option for the control module as a hierarchical selection tree of nested configuration options.

5. The system of claim 1, wherein the one or more predefined components comprise at least one plug-in that expands functionality associated with a standard component or interface.

6. The system of claim 5, wherein the at least one plug-in translates data from one set of selections to another set of selections.

7. The system of claim 1, the module profile defines a dynamic translation from a first module definition type to a second module definition type upon receiving a command to change from the first module definition type to the second module definition type.

8. The system of claim 1, wherein the one or more predefined components include at least one of a dynamic-link library (DLL) an extensible markup language (XML) file, or a component object model (COM) object.

9. The system of claim 1, wherein the module profile defines a behavior associated with at least one of a connection or a configuration of the control module.

10. The system of claim 1, wherein the control module is one of an I/O module, a scanner module, an adapter module, or a network bridge module.

11. The system of claim 1, wherein the module profile is installable on base control system software to provide I/O support for the physical control module.

12. The system of claim 4, wherein the hierarchical selection tree organizes the nested configuration options from least restrictive to most restrictive.

13. The system of claim 1, wherein the input component is configured to receive input that at least one of selects one of the one or more predefined components or creates a new component for inclusion in the module profile.

14. The system of claim 1, wherein the module profile includes an extensible markup language (XML) description of a set of communication transactions applicable to the control module, the XML description driving an extensible messaging facility that facilitates communication with the control module.

15. A method for dynamically configuring functionality associated with a control module, comprising:
employing a processor executing computer-executable instructions stored on a computer-readable storage medium to implement the following acts:
receiving specification information relating to a control module to be configured for use within a control system;
selecting at least one predefined component to be incorporated into an object model of the control module based on the specification information;
assembling the at least one predefined component into the object model;
defining a behavior of the at least one component based on the specification information;
packaging the object model to automatically form a module profile that defines at least one configuration option for the control module, the module profile configured to display the least one configuration option defined by the module profile on a user interface as a tree structure of hierarchical elements of the at least one configuration option;
employing the module profile to select a setting for the at least one configuration option and to load the setting on the control module for operation within the control system; and
dynamically modifying a definition type of the module profile to modify a definition type of the control module through the tree structure without requiring recompilation of core code associated with the module profile.

16. The method of claim 15, wherein the selecting the at least one predefined component comprises selecting from a set of interfaces, extensions, or plug-ins.

17. The method of claim 16, further comprising:
displaying the module profile as a tree structure of hierarchical elements within a user interface; and
receiving input via the tree structure to select the setting for the at least one configuration option.

18. The method of claim 17, further comprising modifying a definition type of the control module through the tree structure in the user interface.

19. A method for generating a module profile for a control module, comprising:
employing a processor executing computer-executable instructions stored on a computer-readable storage medium to implement the following acts:
receiving specification information relating to a control module to be configured for use within a control system;
selecting at least one component, at least one interface, or a combination thereof, from a set of standard components and interfaces;
selecting one or more plug-ins that extend functionality defined by the at least one component or interface;
assembling the at least one selected component, the at least one interface, or the combination thereof, and plug-in into an object model of the control module bases on the specification information;
defining a behavior of the object model based on the specification information;
packaging the object model to automatically generate a module profile for the control module that defines at least one configuration parameter for the control module and that is configured to receive input selecting a setting for the at least one configuration parameter and to load the setting on the control module for operation within the control system, the module profile configured to display the at least one configuration parameter defined by the module profile on a programming interface as a tree structure of hierarchical elements of the at least one configuration parameter; and dynamically modifying a definition type of the module profile to modify a definition type of the control module through the tree structure without requiring recompilation of core code associated with the module profile.

20. The method of claim 19, further comprising defining a behavior of the at least one component, the at least one interface, or the at least one plug-in.

21. The method of claim 19, further comprising assembling the at least one component, the at least one interface, or the combination thereof, and the at least one plug-in for a family of control modules as a re-useable extensible markup language (XML) based group of elements that define available configuration options.

22. The method of claim 21, further comprising defining at least one of a module type, a definition type, a tag, a range, a data type, a definition type, a tag minimum value, a tag maximum value, or an enumeration in the XML based group.

23. The method of claim 19, further comprising defining a structure and organization of the module profile through an extensible markup language (XML) description.

24. The method of claim 19, further comprising installing the module profile on base control system software to provide I/O support for the control module.

25. The method of claim 24, further comprising rendering the module profile on the base control system software as a hierarchical selection tree of nested configuration options, wherein the input selecting the setting for the at least one configuration parameter is received via the hierarchical selection tree.

26. A system having a processor that facilitates dynamic configuration additions or changes for a control module, comprising:

a processor;

a computer-readable storage medium operationally coupled to the processor and storing computer-executable instructions, the computer-executable instructions, when executed by the processor, implement components comprising:

means for defining a set of configuration options for a control module as a dynamically modifiable package based on received specification information relating to the control module;

means for acquiring at least one of a component, an interface, an extension, or a plug-in in accordance with the set of configuration options;

means for assembling the at least one of the component, the interface, the extension, or the plug-in to automatically generate a module profile representing the control module, the module profile comprising an object model for the control module that defines the set of configuration options for the control module and that facilitates selection of a setting for the set of configuration options wherein a behavior of the object model is defined based on the specification information;

means for employing the module profile to display the set of configuration options in a selectable hierarchy of elements; and means for interacting with the selectable hierarchy of elements to select values for the set of configuration options and to dynamically configure the control module in accordance with the values, the dynamic configuring comprising dynamically modifying a definition type of the module profile to modify a definition type of the control module without requiring recompilation of core code associated with the module profile.

* * * * *